(12) United States Patent
Fang et al.

(10) Patent No.: US 8,064,231 B2
(45) Date of Patent: Nov. 22, 2011

(54) SHORT CIRCUIT PROTECTION CIRCUIT FOR A PULSE WIDTH MODULATION (PWM) UNIT

(75) Inventors: Shao-Hua Fang, Shanghai (CN); Chao Chen, Shanghai (CN); Jian-Hua Duan, Shanghai (CN); Ya-Jiang Zhu, Shanghai (CN)

(73) Assignee: BCD Semiconductor Manufacturing Limited, George Town, Grand Cayman (KY)

( * ) Notice: Subject to any disclaimer, the term of this patent is extended or adjusted under 35 U.S.C. 154(b) by 418 days.

(21) Appl. No.: 12/260,585

(22) Filed: Oct. 29, 2008

(65) Prior Publication Data
US 2010/0103705 A1    Apr. 29, 2010

(51) Int. Cl.
*H02M 3/335* (2006.01)
(52) U.S. Cl. .................................. 363/21.18
(58) Field of Classification Search .... 363/21.01–21.18, 363/56.01; 315/291; 349/70
See application file for complete search history.

(56) References Cited

U.S. PATENT DOCUMENTS

| | | | |
|---|---|---|---|
| 6,577,509 B2 * | 6/2003 | Deboy et al. | 363/20 |
| 2001/0053195 A1 * | 12/2001 | Yahiro | 377/76 |
| 2009/0273738 A1 * | 11/2009 | Fukumoto | 349/70 |

* cited by examiner

*Primary Examiner* — Matthew Nguyen
*Assistant Examiner* — Yemane Mehari
(74) *Attorney, Agent, or Firm* — Muncy, Geissler, Olds & Lowe, PLLC

(57) ABSTRACT

A short circuit protection circuit for a pulse width modulation (PWM) unit which includes a PWM logic control circuit, an under voltage lookout (UVLO) circuit and an internal clock circuit; wherein the UVLO circuit detecting a bias power (Vcc) and delivering an UVLO signal when the bias power is judged excessively low, the PWM unit further comprising: a short circuit detector, a short circuit recovery circuit and a frequency multiplexer. The short circuit detector is to detect the UVLO signal and generate a short signal. The short circuit recovery circuit to set a pre-determined recovery time and generate a recovery signal when the pre-determined recovery time ends. The frequency multiplexer which is triggered by the short signal when the short circuit event occurs to change a switching frequency to a short PWM frequency, and triggered by the recovery signal to restore the switching frequency.

4 Claims, 7 Drawing Sheets

SHORT CIRCUIT PROTECTION CIRCUIT FOR A PULSE WIDTH MODULATION (PWM) UNIT

FIELD OF THE INVENTION

A short circuit protection circuit for a pulse width modulation (PWM) unit is to limit system input power during output short circuit operations of emitter drive switching mode power supplies.

BACKGROUND OF THE INVENTION

Compared with linear regulators, switching mode power supplies have the advantages of smaller size higher efficiency and larger output power capability.

Pulse Width Modulation (PWM) is one of major control architectures applied in switching mode power supplies. Emitter drive PWM control has the advantage of fewer pin counts compared with base drive PWM control.

FIG. 1 is an emitter drive switching mode power supply system which includes an emitter drive PWM controller coupled with a primary winding of the transformer through a high voltage NPN power transistor. Energy is transferred to secondary winding from the primary winding in a manner controlled by the PWM controller to provide a constant DC output voltage. The auxiliary winding is coupled with an opto-coupler which provides a bias signal and feedback signal to the PWM controller.

In FIG. 1, the system comprises a PWM controller 100, transformer 102, power transistor 124, shunt voltage regulator 121, opto-coupler 101 and feedback loop composed of 108, 109, 117, 121, 110, 112 and 113.

The PWM controller 100 drives power transistor 124. When Vout rises, the opto-coupler 101 will deliver more current to the capacitors associated with the VCC/FB pin of the PWM controller 100, so as to reduce the duty cycle and the energy transferring to the secondary side to stabilize the Vout.

FIG. 2 is the block diagram of the PWM controller of the prior art. The PWM controller 200 comprises a start-up circuit 201 which is connected between the supply/feedback pin VCC and emitter drive pin OUT. The PWM controller 200 also comprises a hysteresis UVLO comparator 203. During startup phase, capacitors connected to VCC pin are charged by the startup current from OUT pin through start-up circuit 201. The UVLO comparator 203 ends the startup phase by disconnecting the charging path between OUT and VCC and enable the HICCUP comparator 213 when VCC voltage exceeds the upper triggering voltage of the UVLO comparator.

After the start-up phase, the PWM controller 200 starts to operate and VCC pin also receives voltage feedback signal. When Vout falls due to output load current increase, opto-current decreases, VCC/FB voltage will decrease, the duty cycle will increase. When Vcc falls below the lower triggering voltage of the UVLO comparator 203, PWM controller 200 will disable the switching of the power transistor 124 and enable the startup circuit 201. The system reenters the startup phase.

The PWM controller 200 also comprises a peak current comparator 210 which will compare internal current in each switch cycle.

The PWM comparator 205 will adjust the duty cycle according to the feedback voltage and emitter current signals.

The OUT pin will drive the power transistor 124 with varied duty cycle according to the output of PWM comparator 205.

In switching mode power supplies, the function of limiting both instantaneous and average input power is essential during short circuit operation for system reliability. In the prior art of FIG. 1, input power limiting during short circuit operation is implemented by monitoring the voltage at OUT pin when power transistor 124 is off. The resistor divider 212 and HICCUP comparator 213 will detect the OUT voltage during power transistor 124 off time. In the case that the OUT voltage drops below a pre-defined low value (HICCUP voltage) before Vcc drops below to its minimum operating voltage (lower UVLO voltage), the HICCUP comparator 213 will output a low voltage level to disable the PWM comparator 205, thus disables the drive circuit and the whole PWM controller 200. The system will then enter into repeated startup phase. This is called a hiccup mode of the system and the pre-defined voltage of OUT pin is called the HICCUP voltage of the system. The VCC/FB and OUT waveforms in HICCUP mode are illustrated in FIG. 3.

The VCC and OUT waveforms without HICCUP mode are illustrated in FIG. 4.

In either case of FIG. 3 and FIG. 4, the instantaneous system input power is determined by the maximum turn-on time of the PWM pulses. The average system input power is determined by the total turn-on pulses and the charging time of the VCC cap 113 and 112 to the upper UVLO triggering voltage level.

The charging time of the VCC capacitor 113 and 112 to the upper UVLO voltage level is a function of the initial voltage of capacitor 111 when the VCC drops below the lower UVLO voltage level or the OUT pin drops below the HICCUP voltage. In application systems, the coupling among the primary, secondary and auxiliary windings will determine the initial voltage of capacitor 111 when the VCC drops below UVLO voltage or the OUT pin drops below the HICCUP voltage. The VCC restart-up frequency will speed-up for some kind of transformers with higher voltage of capacitor 111. The average short circuit input power will then increase. Especially, when the input line voltage is high, the short circuit power will be larger in the prior art for some kind of transformer design. It may cause PWM controller 200 or power transistor 124 or other device failure and degrade system reliability.

Accordingly, what is needed in the present invention is a PWM controller 200 with both instantaneous and average short circuit input power limiting functions which are transformer insensitive so as to improve system reliability.

This short circuit protection mechanism of the prior art is based upon the hypothesis that the auxiliary winding has good coupling with the secondary winding of transformer. If the coupling between auxiliary winding and secondary winding is not very well, the OUT pin may not drop below the HICCUP voltage during short circuit operation. In this case, VCC voltage will continue to drop until it reaches the lower voltage level of UVLO comparator. The instantaneous system input power will be significantly larger than the case in normal operations because the lower voltage level of the UVLO voltage may be significantly lower than the mean VCC voltage under the condition of maximum output current and normal output voltage. The average system input power will be determined by the mean input power in startup phase multiplied by Ton/(Ton+Toff), where Ton is the time when UVLO comparator outputs high voltage level, and Toff is the time the UVLO comparator outputs low voltage level.

SUMMARY OF THE INVENTION

The general object of the present invention is to provide a short circuit protection circuit for a pulse width modulation (PWM) unit to limit system input power during output short circuit operations of emitter drive switching mode power supplies.

It is a further object of the present invention to provide a reliable and effective method to identify the short circuit event in an emitter drive PWM system.

It is still a further object of the present invention to limit the instantaneous input power under the short circuit conditions of an emitter/source drive PWM system.

It is still a further object of the present invention to limit the average input power under the short circuit conditions of an emitter/source drive PWM system.

It is still a further object of the present invention to guarantee a reliable system recovery from short circuit to normal operation when the system short circuit fault is removed.

In the present invention, the feedback voltage (VCC pin voltage) dropping across the UVLO lower triggering voltage instead of the emitter drive pin (OUT) voltage dropping across the HICCUP voltage is used to identify the short circuit event. This method is more reliable and transformer independent because in emitter drive topology PWM system, the base current of the opto-coupler reduces to zero or near zero when the output of secondary side is shorted to ground.

In FIG. 1, when the secondary side output is shorted to ground, both the cathode pin and control pin voltage are equal or near to ground voltage. There is no current or very little current in the base junction of the opto-coupler 101, so the collector 11 and emitter 12 of opto-coupler 101 is equivalent to open circuit. The current source for VCC pin of PWM controller 100 ceases to provide current, so VCC voltage drops gradually and will be eventually less than the lower triggering voltage of the UVLO comparator 203 of PWM controller 100. Short circuit event can then be recorded by a D-flipflop 704 with the UVLO comparator output as the clock signal, as illustrated in FIG. 7.

When D-flipflop 704's output Q is changed to "1" by the short circuit event., the PWM clock will be changed from normal PWM frequency to a divided frequency by a 2 to 1 multiplexer 705. This will reduce the average input power of the system. The maximum turn on time at divided frequency can also be restricted by 703 for reliable short circuit operations.

Reliable recovery from short circuit operation to normal operation is also guaranteed by this invention when the short circuit fault is removed. In FIG. 7, a periodic narrow pulse (short circuit recovery pulse, SC_R) to reset D-flipflop 704 is generated by a counter 710 and a narrow pulse generator 709. When the D-flipflop 704 is reset, the multiplexer 705 will select the normal PWM frequency for a full startup phase. If short circuit fault is removed before the reset of the D-flipflop 704, the PWM system will restore normal operation during this startup phase. If the system is still in short circuit state, VCC voltage will drop across the lower triggering voltage of UVLO comparator 708 again, and the output Q of D-flipflop 704 will be "1" again to select the divided frequency. If the short circuit fault is removed during the normal startup phase generated by the recovery signal, normal PWM operation may be restored in the current normal startup phase or next normal startup phase, depending on the timing when the short circuit fault is removed.

Limiting the instantaneous system input power in the present invention is achieved by deliberately designing the lower triggering voltage of the UVLO comparator 503 of the PWM controller 500 (FIG. 5) from a system solution point of view. In conventional emitter drive PWM controller 500 design, large margin is reserved for the voltage difference between the VCC/FB voltage at maximum output power and the lower triggering voltage of the UVLO comparator 503 so that one PWM controller 500 is suitable for different output power applications such as 3.5 W and 5 W, and to tolerate different transformer designs. In the present invention, PWM controller 500 design is integrated into the system solution design, so the voltage difference between the VCC/FB voltage at maximum output power and the lower triggering voltage of the UVLO comparator 503 can be designed small enough for a system solution to limit the instantaneous system input power when the VCC/FB voltage falls near the lower triggering voltage during short circuit operations.

It is still a further object of the invention to limit the charging current of the VCC capacitor 112, 113 during UVLO comparator 503 outputting high voltage level (startup phase) to increase the startup time when system is under short circuit conditions.

It is still a further object of the invention to prevent the bipolar power transistor 124 to work in linear region during turn-on time by turning off the PWM switching power transistor 124 when the OUT voltage is below a pre-defined voltage (OUT_UVLO).

A method and circuit implementation to limit both instantaneous and average system input power during system output short circuit in emitter drive Pulse Width Modulated (PWM) switching mode power supplies are described. The opening of feedback loop is used to identify the output short circuit event in emitter drive PWM system. The lower limit of feedback voltage for normal PWM operation (UVLO lower triggering voltage) is used to limit the instantaneous system input power during short circuit operation. The PWM frequency is reduced during the system is in short circuit state so as to limit the system average input power. Normal PWM frequency is restored in one complete startup phase after a fixed time interval so that the system can be recovered from short circuit to normal operating state when the short circuit fault is removed. Thus, both the instantaneous and average system input power can be limited and system operates reliably under output short circuit conditions by applying this invention.

DESCRIPTION OF THE PREFERRED EMBODIMENT

The detailed descriptions for content and technology of the present invention associated with figures are as follows.

Figure 5:
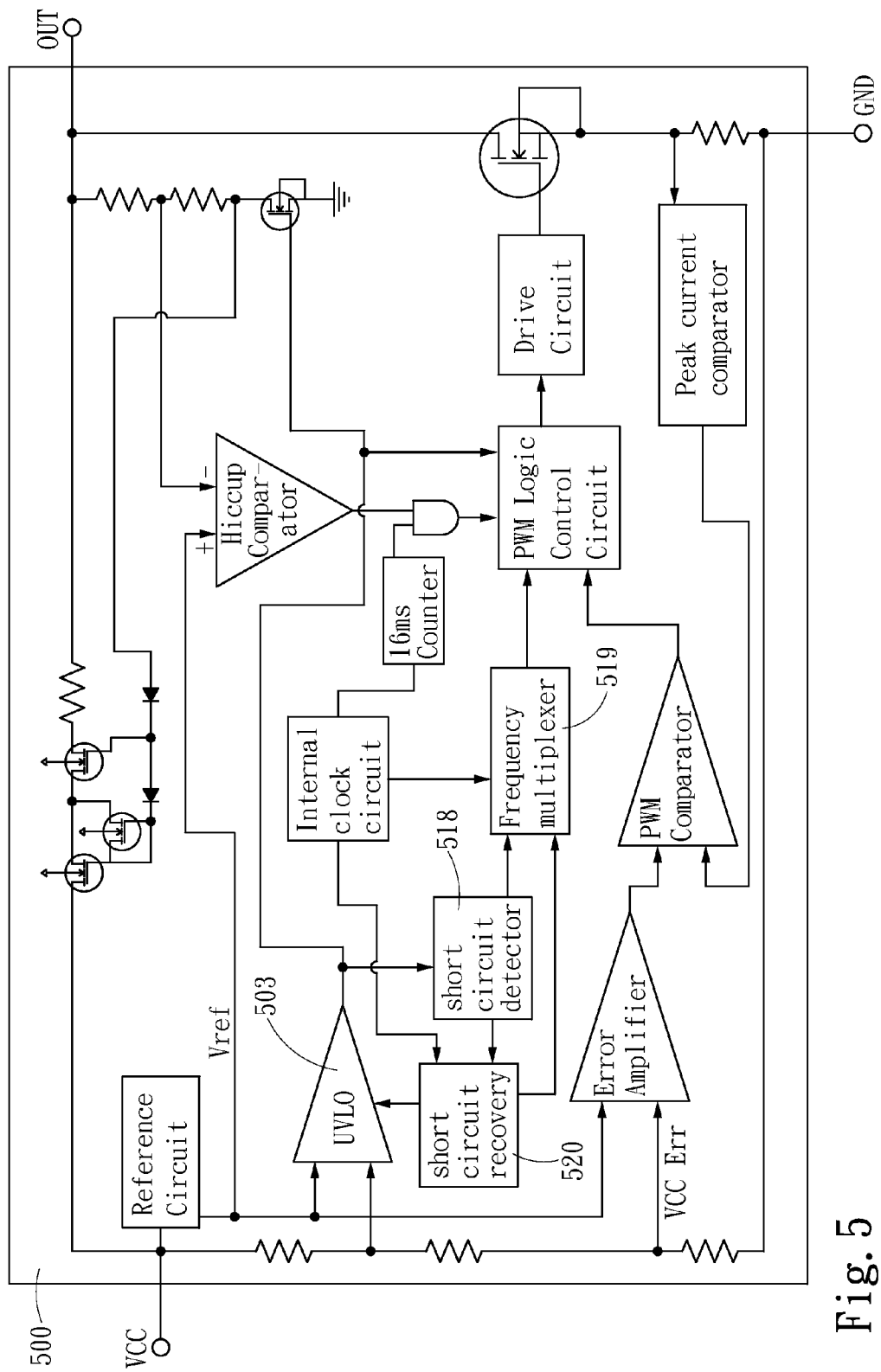
FIG. 5. Functional block diagram of emitter drive PWM controller with short circuit protection of the present invention.

FIG. 5 is the functional block diagram of emitter drive PWM controller with short circuit protection of the present invention. The PWM controller 500 comprises a short circuit detector 518, Frequency multiplexer 519 and short circuit recovery circuit 520. When the short circuit event occurs, the frequency multiplexer 519 will change the switching frequency to short PWM frequency. After a pre-determined recovery time which is set in short circuit recovery circuit 520, the frequency multiplexer 519 will restore the switching frequency to normal PWM frequency.

Figure 6:
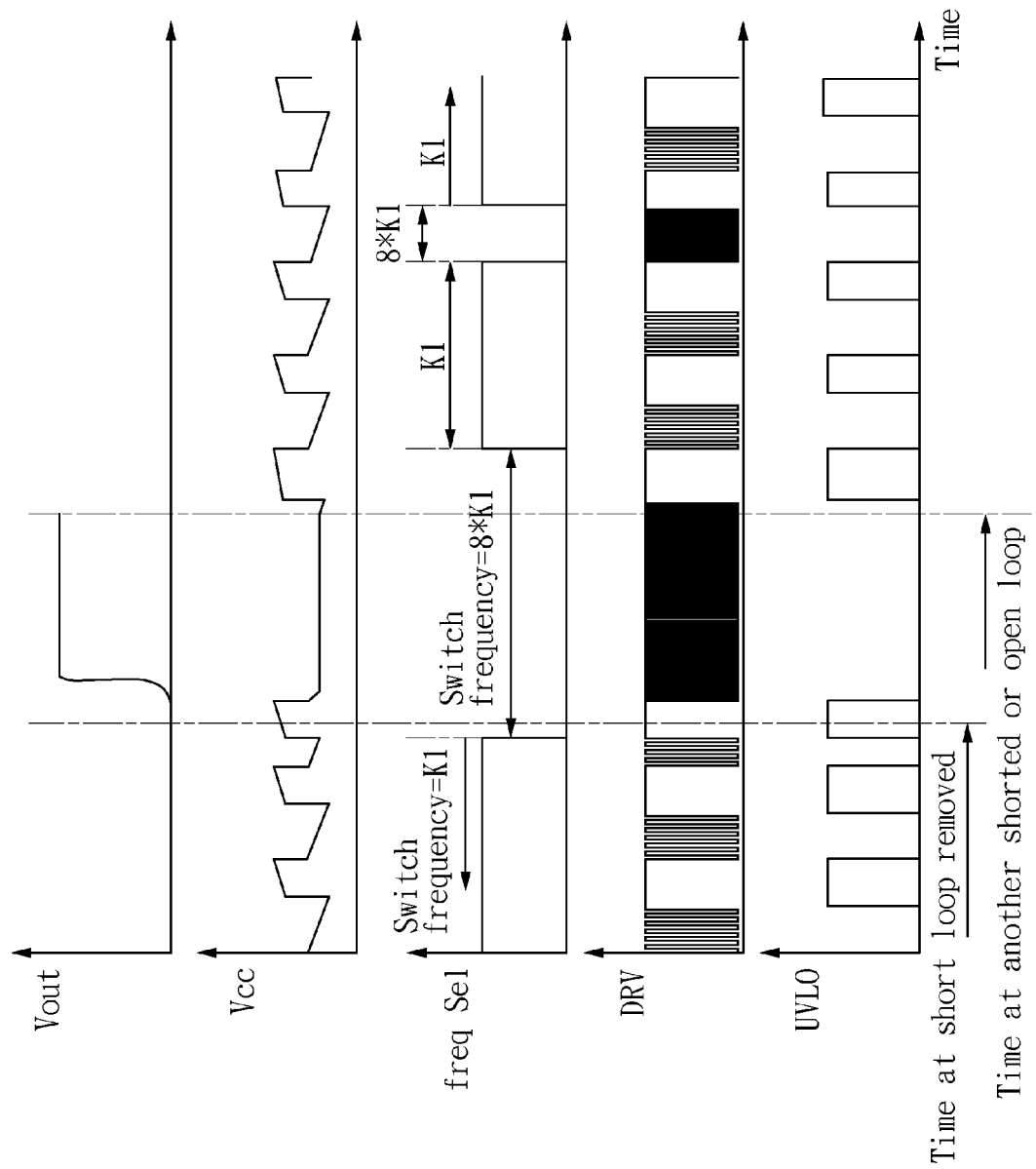
FIG. 6. FB pin and OUT pin waveforms under short circuit conditions of the present invention.

FIG. 6 is one implementation of system recovery after short circuit condition is removed.

Figure 1:
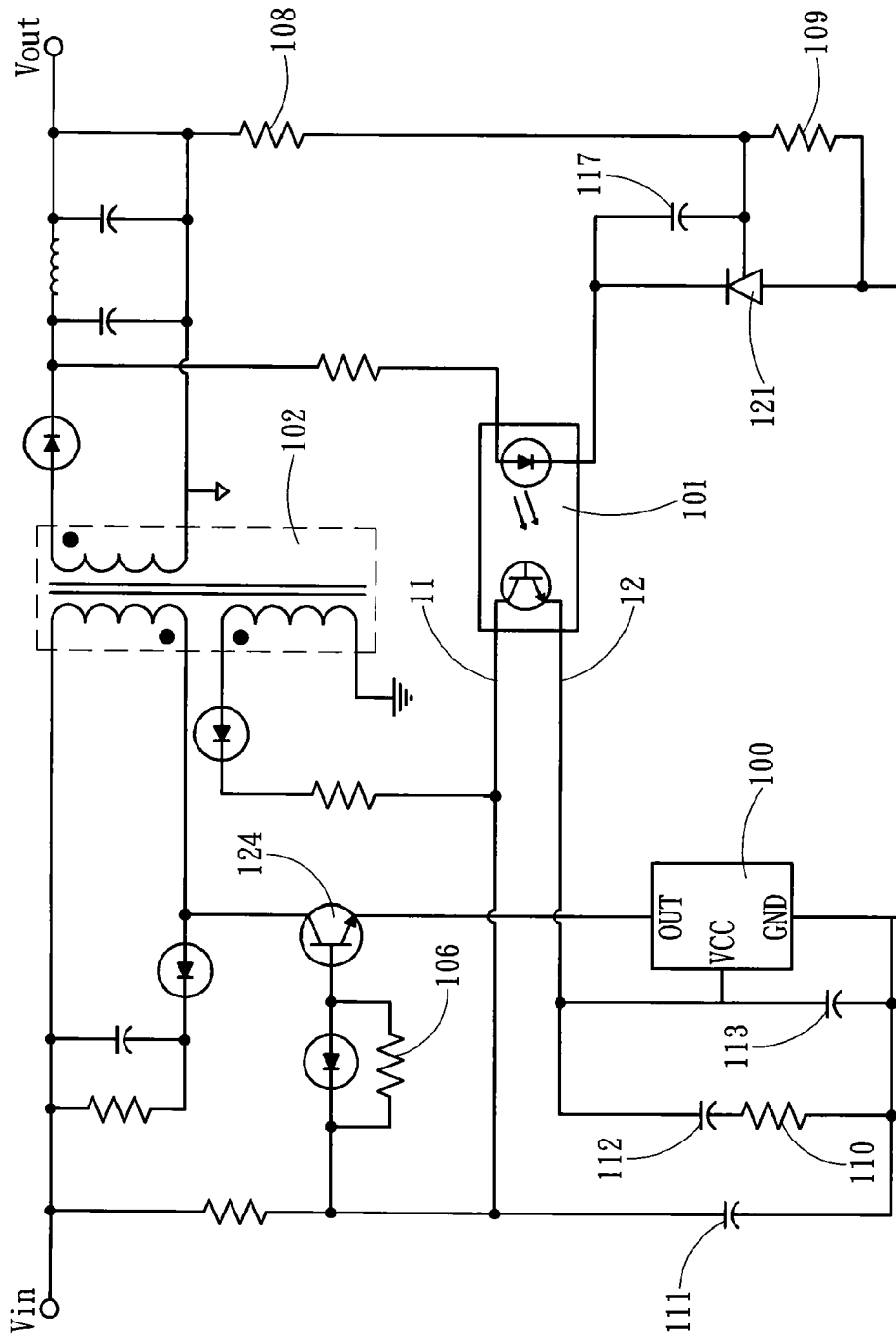
FIG. 1 A typical emitter drive PWM switching mode power supply system.
Figure 2:
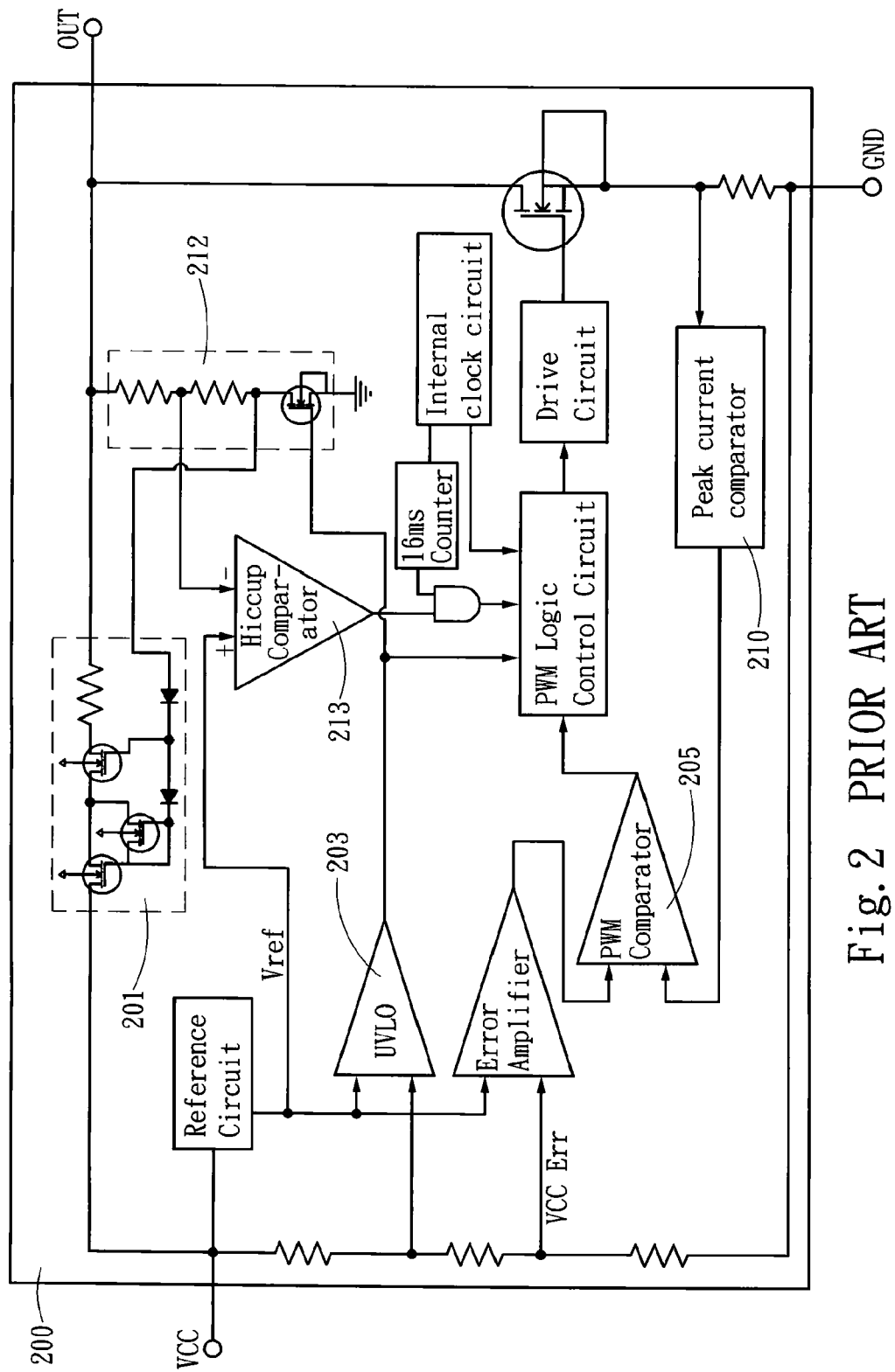
FIG. 2 Functional block diagram of emitter drive PWM controller with short circuit protection (prior art).
Figure 3:
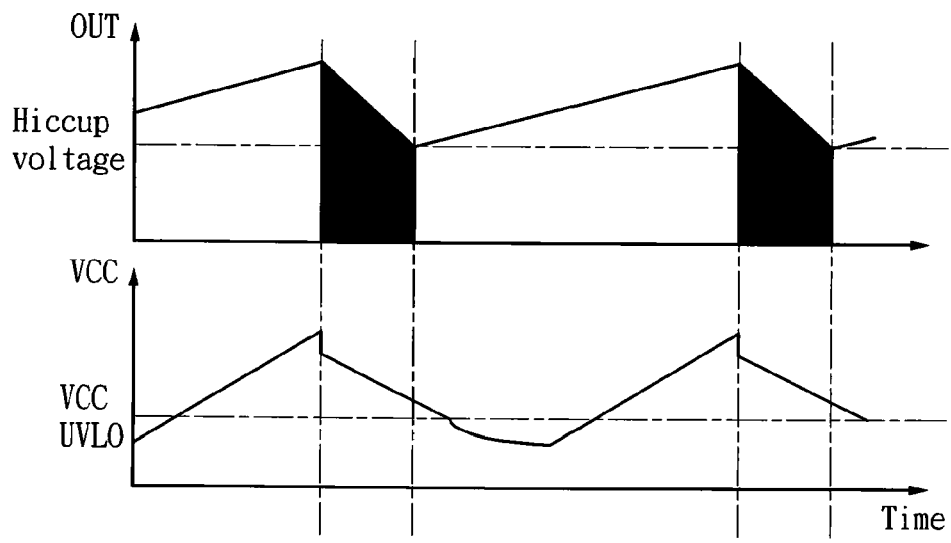
FIG. 3. FB pin and OUT pin waveforms in HICCUP mode (prior art).
Figure 4:
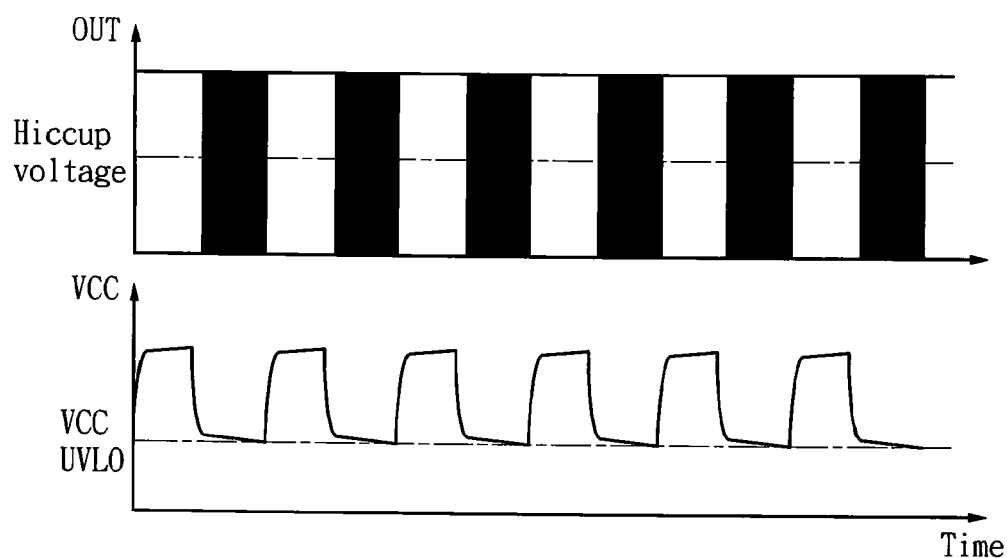
FIG. 4. FB pin and OUT pin waveforms when output voltage always larger than hiccup voltage (prior art).

When Vout is shorted, the VCC capacitors 112, 113 (as seen in FIG. 1) will be charged and discharged periodically due to the repeated startup and UVLO process of open loop operation. The OUT pin switching frequency is reduced to K1, which is ⅛ of normal PWM frequency in the present implementation. The input power is reduced during output short circuit operation due to the reduced switching frequency. If the PWM controller 500 remains working in reduced frequency after short circuit event is identified, the system may not recover to normal output voltage after the short circuit condition is removed. To reliably recover the system after short circuit event, the Freq_Sel will be reset to 0 after a constant time period so that to restore the switching frequency to normal PWM frequency in a complete startup phase. This complete startup phase with normal PWM frequency will guarantee the system to restore to normal output voltage once the short circuit condition is removed.

At another time, the Vout is shorted or open loop again, the VCC will drop to it's UVLO threshold, The freq_Sel will be set to 1, the switching frequency will be reduce to K1 again, waiting for the next constant delay time to detect if the short or open loop is removed.

One circuit embodiment of the present invention includes
1) Short circuit/open feedback loop detection mechanism and circuit implementation in emitter/source drive PWM power supply. Frequency reduction mechanism and circuit implementation in emitter/source drive PWM power supply.
2) System recovery mechanism and implementation after short circuit/open feedback loop condition is removed.
3) Mechanism and implementation of constant charging current of the Vcc cap during UVLO to enlarge the startup time when system is in short circuit or open feedback loop conditions.

Figure 7:
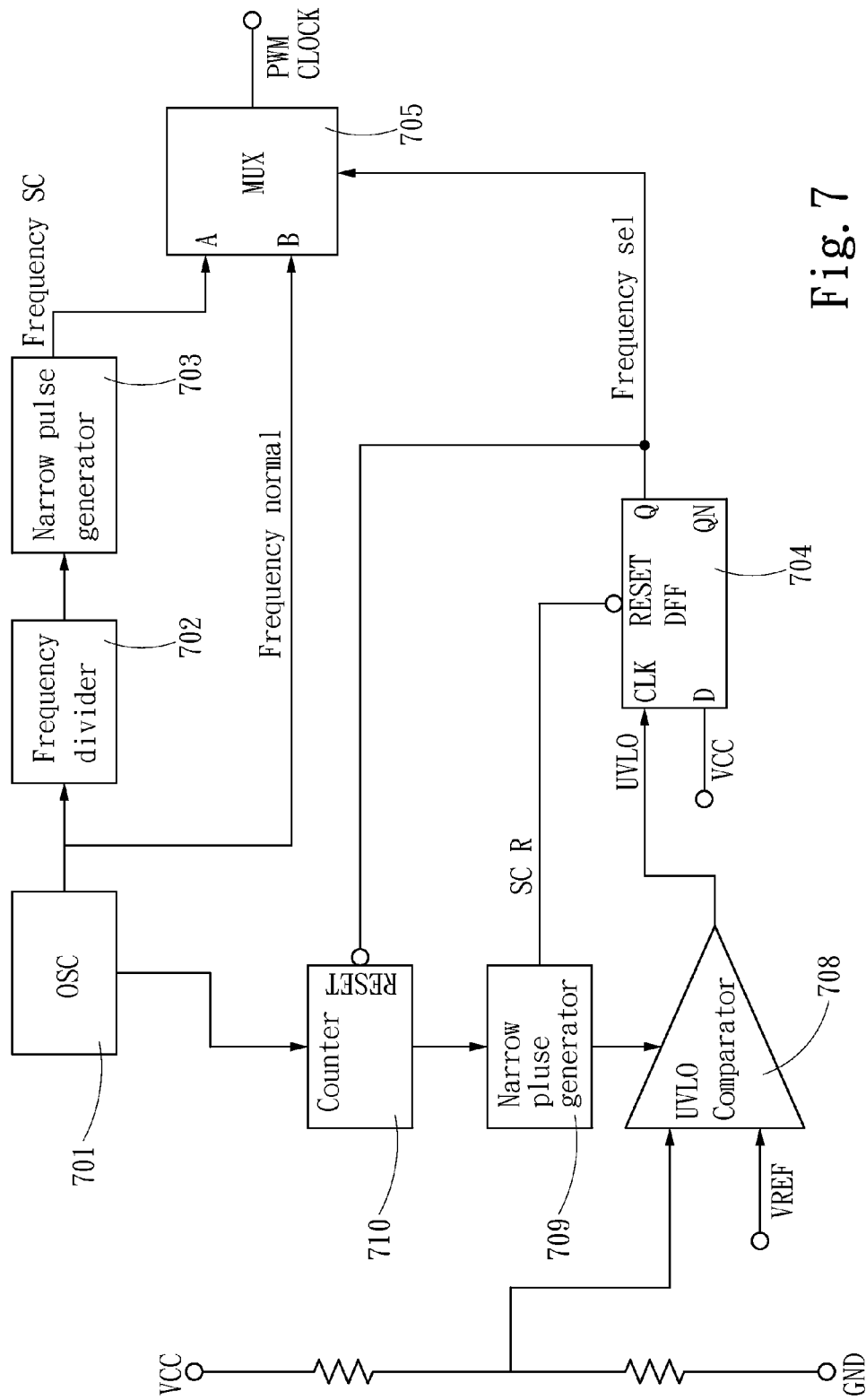
FIG. 7. One implementation of the present invention to identify short circuit event and reduce PWM frequency under short circuit conditions of emitter drive system.

FIG. 7 is a short circuit detector circuit and short circuit recovery circuit block diagram according to an embodiment of the present invention. As shown, they comprise an oscillator 701, a frequency divider 702, two narrow pulse generators 703 and 709, a D-flipflop 704, a two-input multiplexer 705, a counter 710 and a UVLO comparator 708. The frequency divider 702 divides the 75% duty-cycle input frequency which is generated by oscillator 701 and gives a 50% duty-cycle low frequency output. The narrow pulse generator 703 reduces the duty-cycle of the input low frequency according to the requirement of average input power and the OUT voltage (as seen in FIG. 5). The counter 710 and narrow pulse generator 709 set the SC_R signal and the UVLO comparator 708 sets the UVLO signal according to the short circuit condition. The output Q of the D-flipflop 704 is decided by the input signals of SC_R and UVLO. The input signal S in the two-input multiplexer 705 is the selecting signal, which controls which of two frequency, normal frequency or short frequency, will be transmitted to the output. During the start-up, the signal SC_R is low and forces the output Q to low state. During normal operation, the signal SC_R is high and the UVLO signal is low, so the output Q retains low state and PWM switching clock is the normal frequency. During short circuit or open feedback loop conditions, UVLO signal will change from low to high, and force the DFF output Q to high state, so the output frequency of two-input multiplexer 705 is short frequency. After a pre-determined recovery time, the reset signal SC_R of DFF will give a narrow low level signal and force the output Q of DFF to low level, so the output frequency of two-input multiplexer 705 is normal frequency. If the system is remain in short circuit or open feedback loop conditions, the UVLO signal will change from low to high again, and the second cycle is beginning. Thus the average input power can be reduced through reducing the frequency and limiting the maximum duty cycle.

Figure 8:
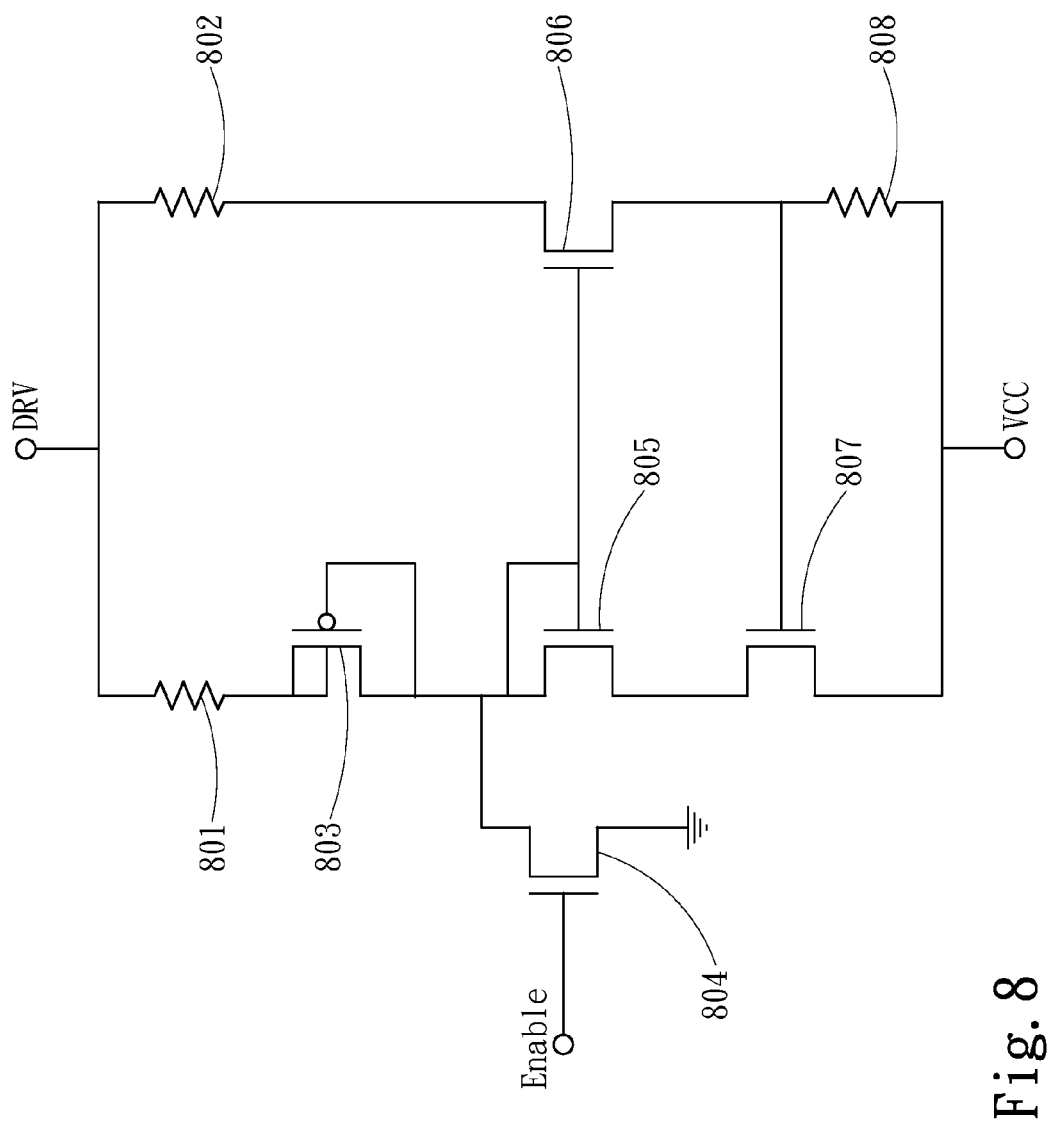
FIG. 8. One implementation of constant charging current of the VCC capacitors during startup phase to enlarge the startup time when system is under short circuit conditions.

FIG. 8 is a constant charging current circuit according to an embodiment of the present invention. It comprises two limited resistances 801 and 802, a diode connected PMOS transistor 803, a diode connected NMOS transistor 805, a bias resistance 808 and three high voltage NMOS transistors 804, 806 and 807. The resistances 801 and 802 limit the maximum current of their respective current branch. The diode connected PMOS transistor 803 raises the start-up voltage of DRV. The gate signal of NMOS transistor 804 decides whether the constant charging current circuit operates or not. The NMOS transistor 805 isolates the path from VCC to the drain of NMOS 804 during normal operation. The constant charging current is decided by the threshold of NMOS 807 and the resistance 808. During normal operation, the NMOS 804 operates in deep triode region and NMOS 806 in cut-off region, so the charging path is turned off. In short circuit or open feedback loop conditions, VCC reduces to UVLO and the NMOS 804 operates in cut-off region and NMOS 806 in saturation region, so the charging path is turned on. The constant charging current is given by $I=Vth/R_{808}$. When VCC increases to start up voltage, the charging path is turned off again. Thus the average input power can be reduced through enlarging the startup time when system is in short circuit or open feedback loop conditions.

While the advantages and embodiments of the present invention have been depicted and described, there are many more possible embodiments, applications and advantages without deviating from the spirit of the inventive ideas described herein. It will be understood by those skilled in the art that many changes in construction and widely differing embodiments and applications of the invention will suggest themselves without departing from the spirit and scope of the invention. Thus the disclosures and descriptions herein are purely illustrative and are not intended to be in any sense limiting.

What is claimed is:

1. A short circuit protection circuit for a pulse width modulation (PWM) unit which includes a PWM logic control circuit, an under voltage lookout (UVLO) circuit and an internal clock circuit; wherein the UVLO circuit detecting a bias power (Vcc) and delivering an UVLO signal when the bias power is judged excessively low, the PWM unit further comprising:
a short circuit detector to detect the UVLO signal and generate a short signal;
a short circuit recovery circuit to set a pre-determined recovery time and generate a recovery signal when the pre-determined recovery time ends; and
a frequency multiplexer which is triggered by the short signal when the short circuit event occurs to change a switching frequency to a short PWM frequency, and triggered by the recovery signal to restore the switching frequency.

2. The short circuit protection circuit for a pulse width modulation (PWM) unit of claim 1, wherein the short circuit detector is a D-flipflop and the short circuit event is recorded by the D-flipflop.

3. The short circuit protection circuit for a pulse width modulation (PWM) unit of claim 1, wherein the short circuit recovery circuit includes a narrow pulse generator and a counter; the counter setting the pre-determined recovery time, the narrow pulse generator delivering the recovery signal when the pre-determined recovery time ends.

4. The short circuit protection circuit for a pulse width modulation (PWM) unit of claim 1, wherein the frequency multiplexer includes a frequency divider, a narrow pulse generator and a two-input multiplexer; the frequency divider dividing 75% of a duty-cycle input frequency generated by an oscillator and providing 50% of duty-cycle low frequency output, the narrow pulse generator reducing the duty-cycle of an input low frequency according to requirements of average input power and an OUT voltage, the counter and the narrow pulse generator setting a SC_R signal, the UVLO signal being set by an UVLO comparator according to short circuit conditions, an output (Q) of the D-flipflop being decided by the input signals of SC_R and UVLO, an input signal S in the two-input multiplexer being a selecting signal to control which of two frequencies of a normal frequency and a short frequency to be transmitted to the output.

\* \* \* \* \*